(12) United States Patent
Agarwal et al.

(10) Patent No.: US 11,474,783 B2
(45) Date of Patent: *Oct. 18, 2022

(54) SYSTEMS AND METHODS FOR OPERATING A MOBILE APPLICATION USING A CONVERSATION INTERFACE

(71) Applicant: Celligence International LLC, Guaynabo, PR (US)

(72) Inventors: Pavan Agarwal, Arcadia, CA (US); Gabriel Albors Sanchez, Arcadia, CA (US); Jonathan Ortiz Rivera, Arcadia, CA (US)

(73) Assignee: Celligence International LLC, Guaynabo, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,153

(22) Filed: Apr. 27, 2021

(65) Prior Publication Data
US 2021/0247959 A1 Aug. 12, 2021

Related U.S. Application Data

(63) Continuation of application No. 16/565,452, filed on Sep. 9, 2019, now Pat. No. 10,992,605.

(51) Int. Cl.
*G06F 3/16* (2006.01)
*H04W 4/12* (2009.01)
(Continued)

(52) U.S. Cl.
CPC .............. *G06F 3/167* (2013.01); *G06F 3/017* (2013.01); *G06F 3/0484* (2013.01); *G06F 9/453* (2018.02);
(Continued)

(58) Field of Classification Search
CPC ................... G06F 3/0484; G06F 9/453; G06F 2203/04803; H04L 51/02; H04L 51/04
See application file for complete search history.

(56) References Cited

U.S. PATENT DOCUMENTS 9,585,159 B2 2/2017 Rastas
10,356,243 B2 7/2019 Sanghavi
(Continued)

OTHER PUBLICATIONS

International Search Report and Written Opinion in PCT/US2020/049891, dated Oct. 7, 2020.
(Continued)

*Primary Examiner* — Chirag R Patel

(57) ABSTRACT

Systems and methods are provided for control and operate a mobile application comprising a graphical user interface (GUI) via natural language commands using a conversation or chat interface associated with a chat application. The chat application may be initiated after obtaining a respective command from a computing device operated by a user. The conversation interface may be displayed adjacent to a mobile application. The conversation interface may be configured to receive user input comprising user commands, and display assistant user input comprising responses generated by an assistant user based on the user input. The mobile application may be updated based on the user input received from the user. The mobile application may be updated comprising outputting an output command associated with one or more actions that may occur in the mobile application.

16 Claims, 9 Drawing Sheets

(51) Int. Cl.
*G06F 3/01* (2006.01)
*G10L 15/18* (2013.01)
*G06F 9/451* (2018.01)
*G10L 15/22* (2006.01)
*G06F 3/0484* (2022.01)
*H04L 51/02* (2022.01)

(52) U.S. Cl.
CPC .............. *G10L 15/18* (2013.01); *G10L 15/22* (2013.01); *H04L 51/02* (2013.01); *H04W 4/12* (2013.01); *G06F 2203/04803* (2013.01); *G10L 2015/223* (2013.01)

(56) References Cited

U.S. PATENT DOCUMENTS

| | | |
|---|---|---|
| 10,496,705 B1 | 12/2019 | Irani |
| 10,684,703 B2 | 6/2020 | Hindi |
| 10,686,738 B2 | 6/2020 | Daniel |
| 2009/0112991 A1* | 4/2009 | Gandhi ................ G06Q 10/107 709/205 |
| 2011/0251954 A1 | 10/2011 | Chin |
| 2016/0098988 A1 | 4/2016 | Goussard |
| 2016/0234244 A1 | 8/2016 | Mehta |
| 2016/0360382 A1 | 12/2016 | Gross |
| 2017/0243195 A1 | 8/2017 | Xing |
| 2017/0272654 A1 | 9/2017 | Poindexter |
| 2017/0295122 A1 | 10/2017 | Pfriem |
| 2017/0372189 A1 | 12/2017 | Joo |
| 2018/0068226 A1* | 3/2018 | O'Connor ................ G06F 40/30 |
| 2019/0188781 A1 | 6/2019 | O'Brien |
| 2019/0210561 A1 | 7/2019 | Middelanis |
| 2020/0034399 A1 | 1/2020 | Beno |

OTHER PUBLICATIONS

International Preliminary Report on Patentability in PCT/US2020/049891, dated Mar. 9, 2022.

* cited by examiner

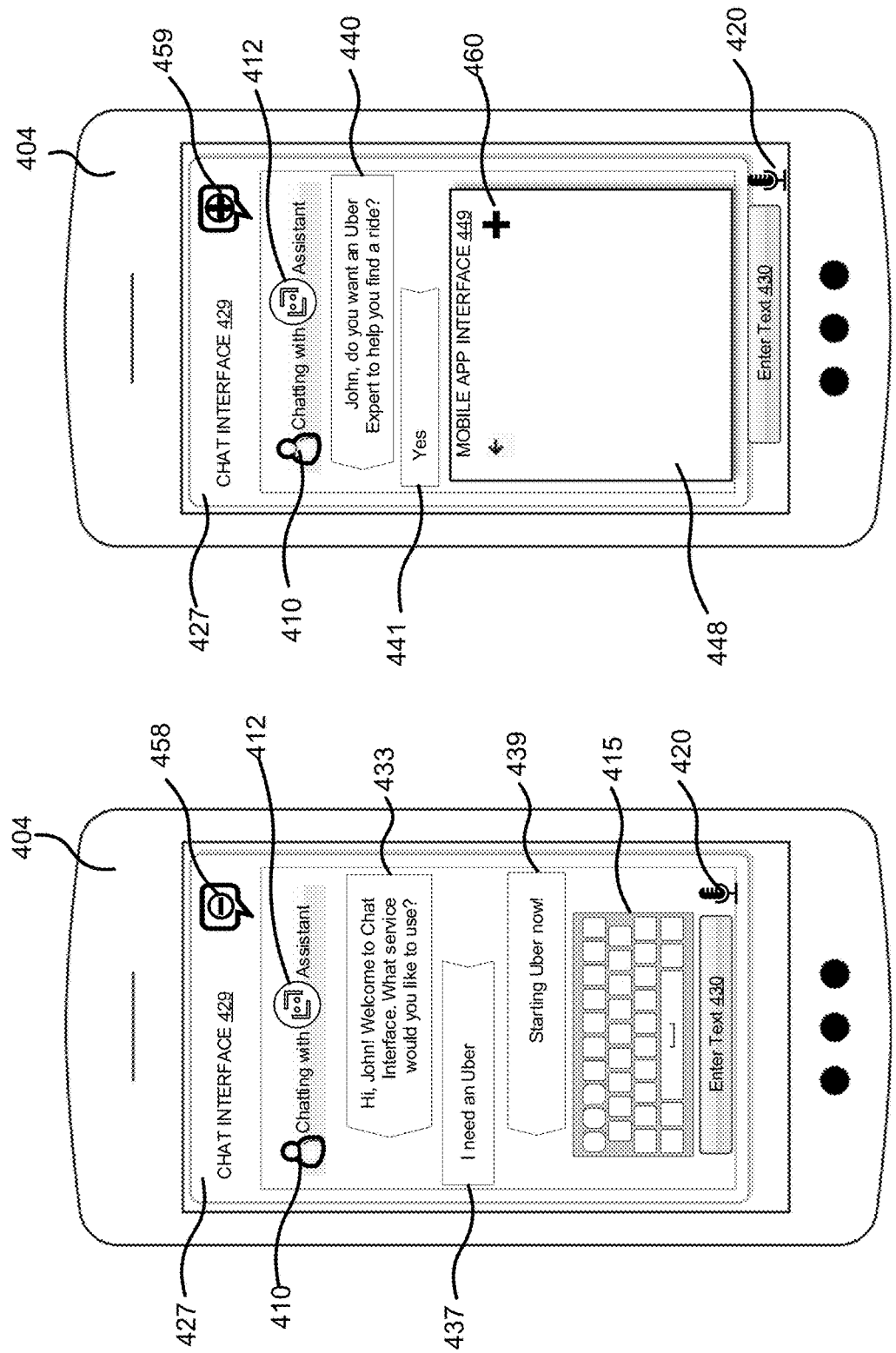

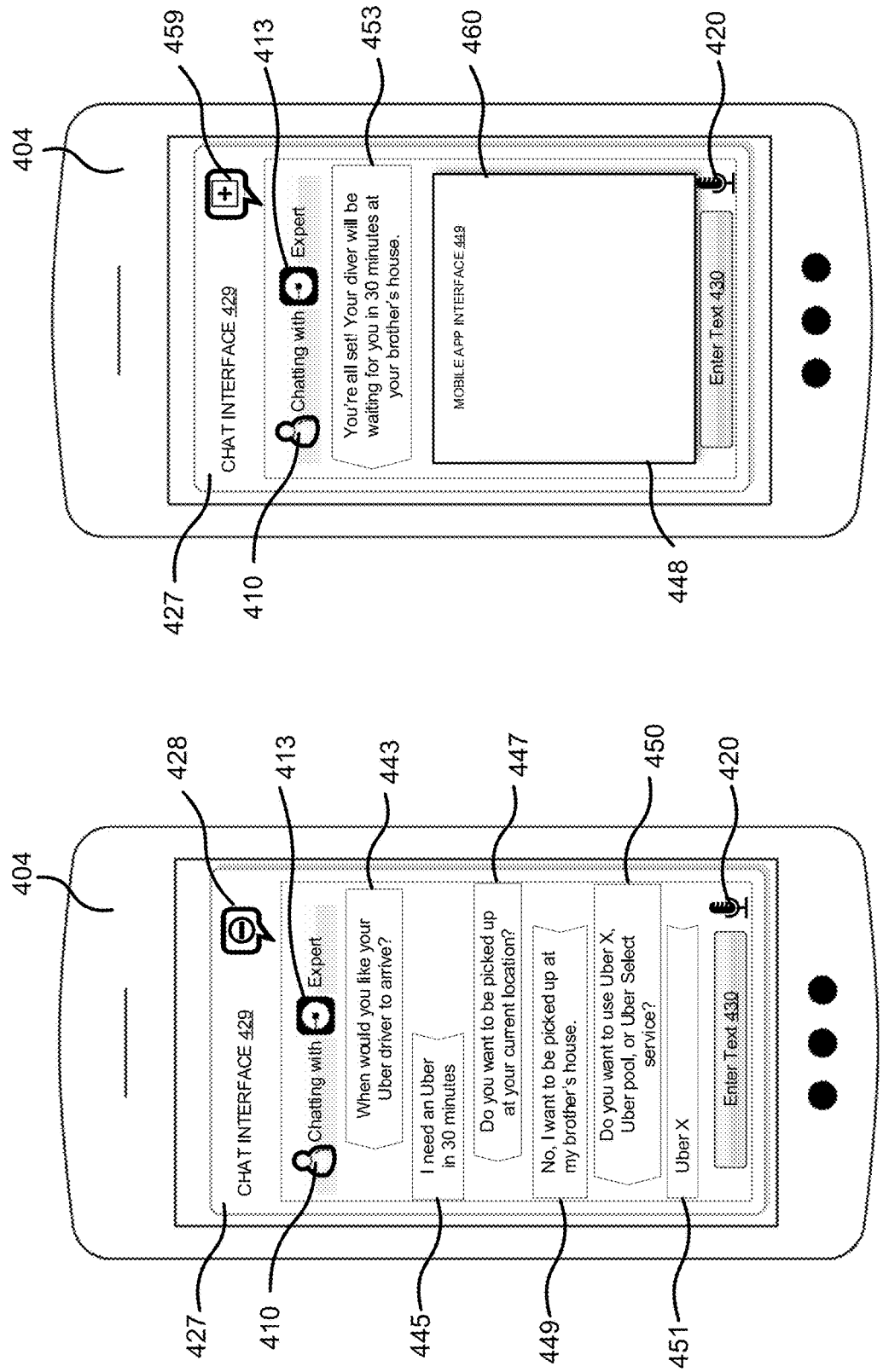

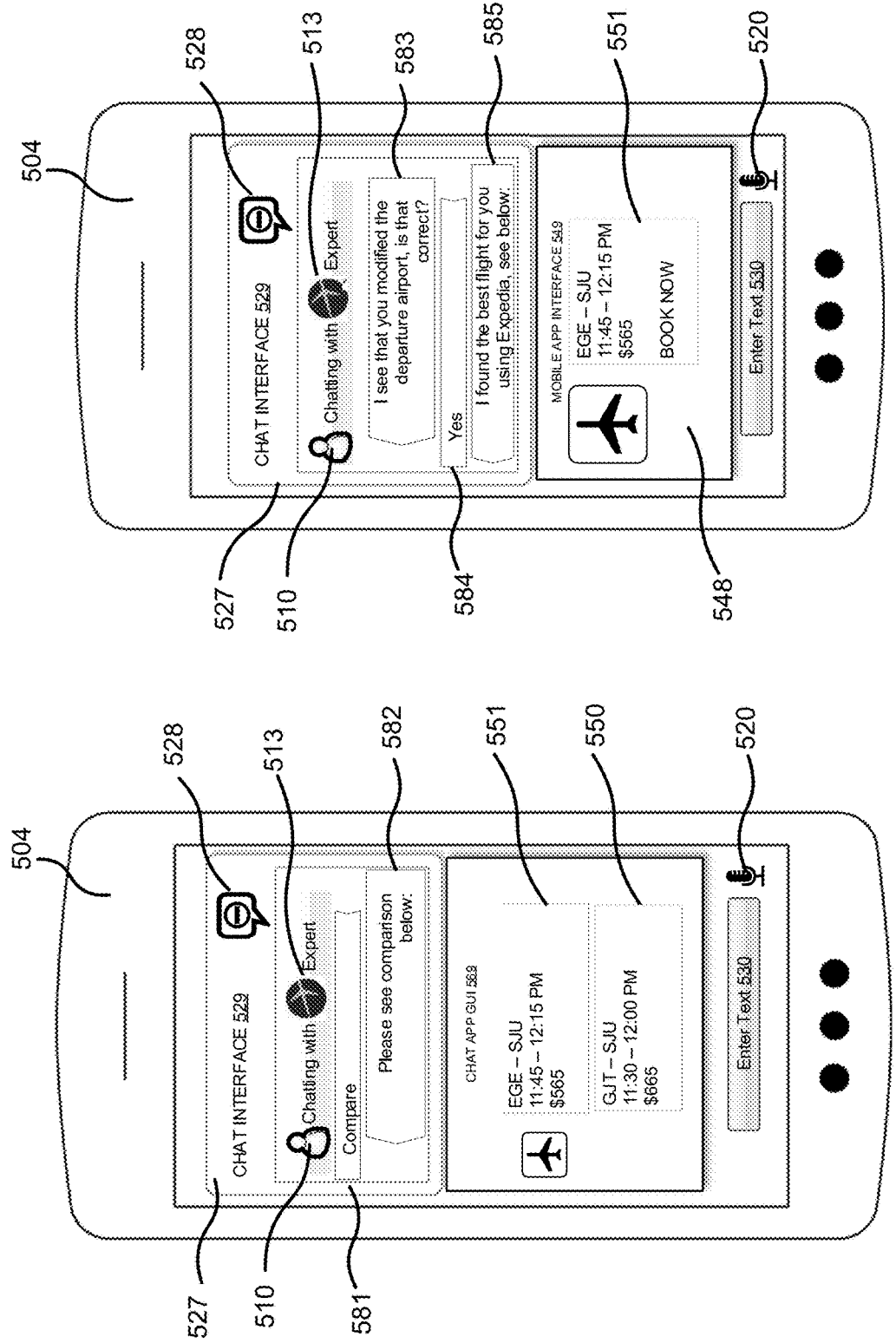

SYSTEMS AND METHODS FOR OPERATING A MOBILE APPLICATION USING A CONVERSATION INTERFACE

RELATED APPLICATIONS

This application is a continuation of U.S. patent application Ser. No. 16/565,452 filed on Sep. 9, 2019, the contents of which are incorporated herein by reference in its entirety.

TECHNICAL FIELD

The present disclosure is generally related to user interfaces. More particularly, the present disclosure is directed to systems and methods for controlling the operation of a mobile application using a conversation interface.

BACKGROUND

A user interface is a system by which users interact with a computing device, such as a computer or a mobile electronic device. In general, a user interface allows users to input information to manipulate the computing device. A user interface also allows the computing device to output information as to the effects of the manipulation. In computing, a graphical user interface (GUI) is a type of user interface that allows users to interact with computing devices with images rather than text commands. That is, a GUI represents the information and actions available to a user through graphical icons and visual indicators such as secondary notation, as opposed to text-based interfaces, typed command labels or text navigation. The actions are usually performed through direct manipulation of the graphical elements.

An electronic form is a type of GUI view that is specifically designed to allow a user to enter data in a structured manner for processing by a computing device. An electronic form is an electronic version of a physical form, such as a paper document with blank spaces for insertion of required or requested information. An electronic form provides an input template comprising various combinations of checkboxes, radio buttons, form fields, and other GUI elements designed to query and display data.

While GUI interfaces are intuitive and provide a convenient interface, they may present some challenges for some users, especially unsophisticated or elderly operators. An inexperienced user may often have difficulties locating the correct icon or form within the GUI of application when attempting to invoke desired functionality. Accordingly, a user may be forced to underutilize the capabilities of an application, or worse, end up with an unsatisfactory result. There is an ongoing need for improved systems and methods to allow users to interact with an application that operates with a GUI interface.

SUMMARY

In accordance with one or more embodiments, various features and functionality can be provided to enable or otherwise facilitate control and operation of a selected mobile application comprising a native GUI via an exchange of natural language commands in a conversation interface.

In some embodiments, the system for controlling the operation of a selected mobile application may include obtaining a command for initiating a conversation interface. For example, the command may be originating from a computing device operated by a user. In some embodiments, the conversation interface may be displayed adjacent to a mobile application, the mobile application comprising a graphical user interface (GUI).

In some embodiments, the conversation interface may be configured to receive user input comprising one or more user commands. In some embodiments, the conversation interface may display assistant user input comprising one or more responses generated by an assistant user based on the user input.

In some embodiments, a first user input comprising a first text command may be obtained. For example, the first user input may be entered by the user via the client computing device and displayed in the conversation interface. In some embodiments, a first response generated by the assistant user in response to the first user input may be obtained. For example, the first response may be displayed in the conversation interface.

In some embodiments, the mobile application may be updated based on the first user input received from the user. In some embodiments, updating the mobile application may include outputting an output command associated with one or more actions that may occur in the mobile application. For example, the actions that occur within the mobile application may include at least one of a travel reservation, a dining reservation, and a purchase transaction. In some embodiments, updating of the mobile application may include updating the GUI of the mobile application.

In some embodiments, the output command may comprise output data associated with updating of the mobile application based on the user input. For example, the output command may comprise output data associated with the first user input.

In some embodiments, a modified user input comprising a modified text command may be obtained. For example, the first user input entered via the client computing device and displayed in the conversation interface may be modified by the user.

In some embodiments, the mobile application may be updated based on the modified user input. In some embodiments, the output command may comprise output data associated with the updating of the mobile application based on the modified user input. In some embodiments, a graphical representation of the output command data associated with the first and modified user input may be generated and displayed in the conversation interface.

In some embodiments, the command for initiating the conversation interface may be obtained during an active session of the mobile application operation by the user.

In some embodiments, account information associated with the mobile application operated by the user may be obtained. For example, the account information comprising historic user data indicating commands previously generated by the user and received by the mobile application. In some embodiments, a geographic location associated with the computing device operated by the user and indicating a real world location of the user may be obtained.

In some embodiments, a second response generated by the assistant user may be obtained. For example, the second response may be based on the historic user data and the real world location of the user.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

FIGS. 4A-4D illustrate an example chat interface used to operate a mobile application, according to an implementation of the disclosure.

FIGS. 5A-5E illustrate an example chat interface used to operate a mobile application, according to an implementation of the disclosure.

DETAILED DESCRIPTION

Figure 1:
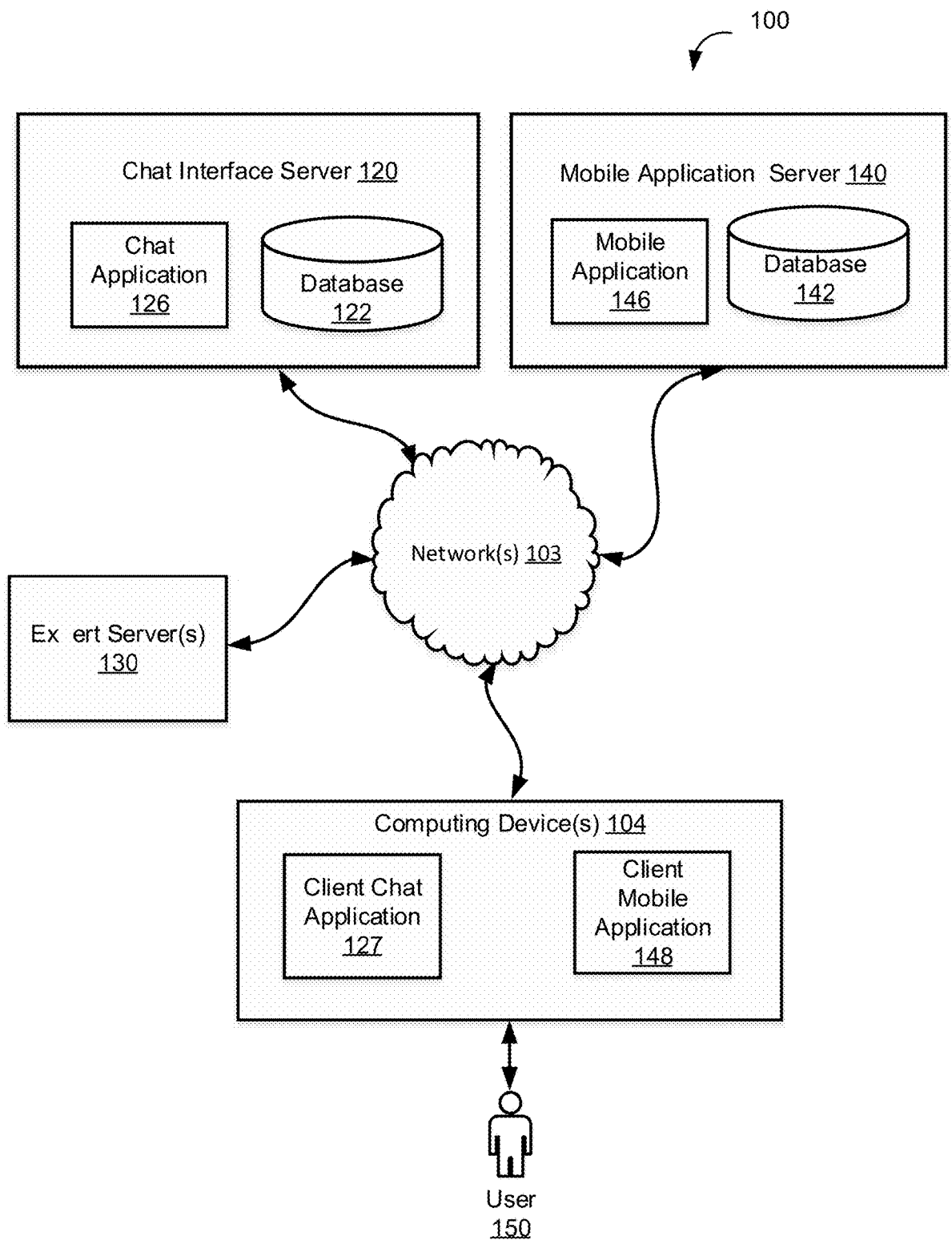
FIG. 1 illustrates example systems and a network environment, according to an implementation of the disclosure.

Described herein are systems and methods for control the operation of a selected mobile application with a native GUI via an exchange of textual data between users and experts in a conversation interfaces. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, users may experience challenges when interacting with a mobile application with a GUI. In particular, users that use mobile applications do so with a particular purpose and often to solve a particular problem (e.g., reserve airline tickets or purchase an item). When using an application to complete a task users are forced to do so by interacting with an application via an interface, more specifically a GUI. However, all GUI interfaces are essentially artificial creations invented to enable interactions between a user and a device. Accordingly, users have to adapt to interfaces, i.e., learn the rules on how to operate them. Because of this added cognitive demands associated with using a GUI, users focus less on solving the problem and more on learning the GUI.

Humans use spoken language as a natural interface. Thus, the most comfortable way for humans to solve problems is through a conversation. By allowing users to interact with an application using natural language, results in a more user-friendly interaction between users and the application and produce satisfactory user experience.

In accordance with various embodiments, a user can interact with a mobile application by invoking a conversation or chat interface of a chat application rather than use native GUI of the mobile application. For example, a user can interact with a particular mobile application using text commands in a natural language without having to learn new skills to interact with the GUI. Because the chat interface is invoked contemporaneously with and is displayed next to the application, the user can control existing mobile applications including their underlining functionalities and utilize data associated with those applications without the need to reenter or otherwise provide information necessary to complete their task. Finally, by presenting the chat interface next to the mobile application GUI, allows the user to visually observer the results of their interactions, as if they were interacting with the application via the GUI rather than the chat interface. In other words, by virtue of seeing the outcome of their interactions allows the users to preserve the positive aspects of a GUI (e.g., visual representation of results) while improving user's ability to effectively interact with the mobile application.

Before describing the technology in detail, it is useful to describe an example environment in which the presently disclosed technology can be implemented. FIG. 1 illustrates one such example environment 100.

FIG. 1 illustrates an example environment 100 for providing a chat interface for interacting with mobile applications, as described herein. In some embodiments, environment 100 may include a chat interface server 120, a one or more expert servers 130, a mobile application server 140, a one or more client computing devices 104, and a network 103. A user 150 may be associated with client computing device 104 as described in detail below.

Figure 2:
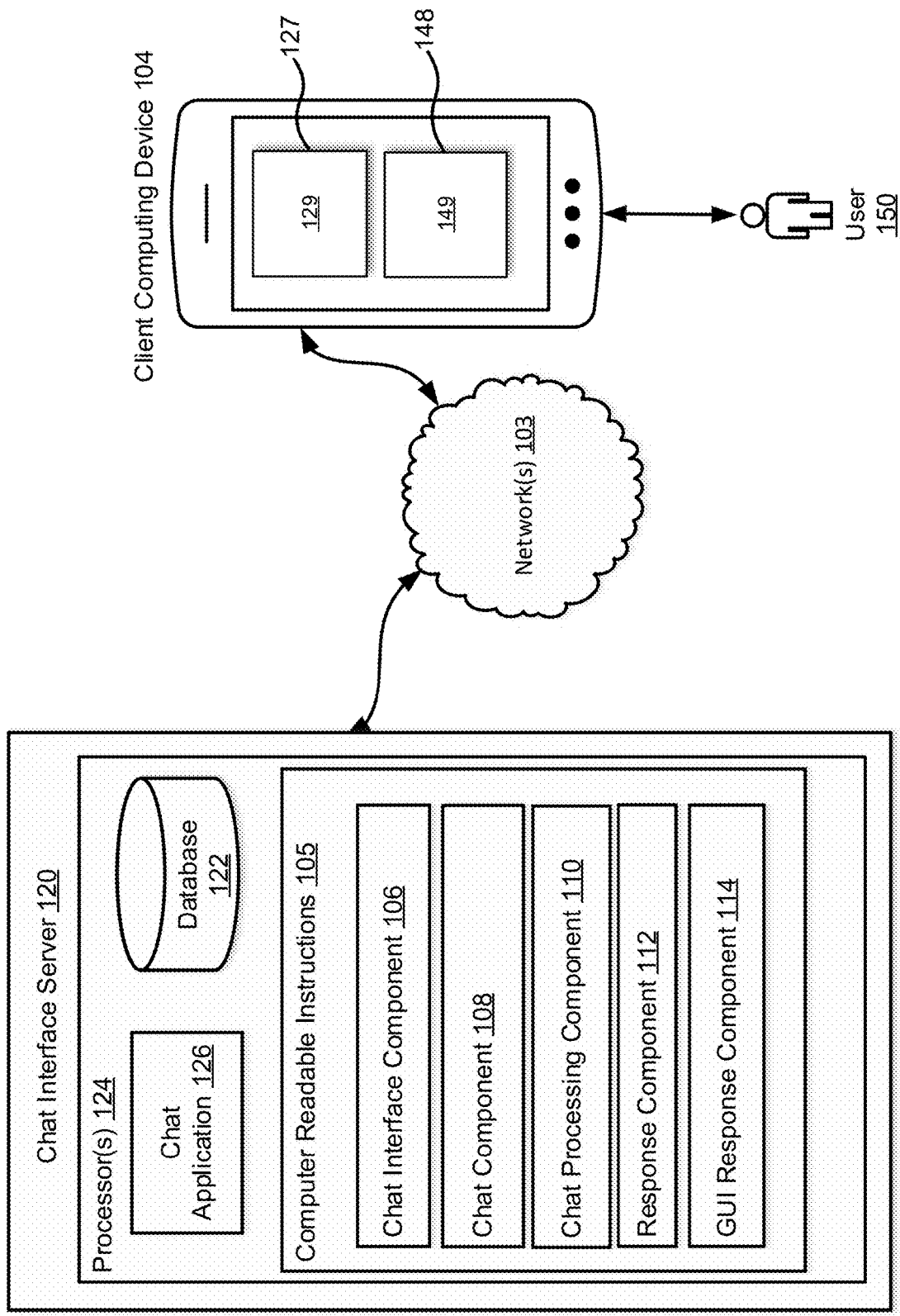
FIG. 2 illustrates an example chat interface server of the example system of FIG. 1, according to an implementation of the disclosure.

In some embodiments, the various below-described components of FIG. 1 may be used to initiate a client chat application 127 (i.e., the chat application running on client computing device 104 provided by a distributed chat application 126) within client computing device 104. For example, client chat application 127 may comprise a chat interface (e.g., as illustrated in FIG. 2) and may be configured to control and/or operate a client mobile application 148 running on client computing device 104 (client mobile application 148 may be provided by a distributed mobile application 146 running on mobile application server 140).

In some embodiments, client chat application 127 may be initiated after client mobile application 148 has been initiated. For example, the various components of FIG. 1 may be configured to initiate client chat application 127 upon receiving user input associated with initiating client chat application 127 as will be described in detail below. For example, user 150 may first initiate client mobile application 148 via one or more user inputs associated with initiating client mobile application 148. Next, user 150 may provide additional user input configured to initiate client chat application 127 to run alongside or next to client mobile application 148 on client computing device 104. In some embodiments, the various components of FIG. 1 may be configured to initiate client chat application 127 upon initiating client mobile application 148 automatically, i.e., without receiving additional user input.

In some embodiments, client chat application 127 may be initiated upon receiving user input associated with initiating the chat application as will be described in detail below. For example, user 150 may provide user input (e.g., knocking or tapping) within a GUI associated with client computing device 104. In some embodiments, the various components of FIG. 1 may be configured to initiate client mobile application 148 by user input within the chat interface of client chat application 127. For example, user 150 may provide user input within the chat interface to initiate client mobile application 148.

In some embodiments and as will be described in detail in FIG. 2, chat interface server 120 may include a processor, a memory, and network communication capabilities. In some embodiments, chat interface server 120 may be a hardware server. In some implementation, chat interface server 120 may be provided in a virtualized environment, e.g., chat interface server 120 may be a virtual machine that is executed on a hardware server that may include one or more other virtual machines. Chat interface server 120 may be communicatively coupled to a network 103. In some embodiments, chat interface server 120 may transmit and receive information to and from one or more of client computing devices 104, mobile application server 140, one or more expert servers 130, and/or other servers via network 103.

In some embodiments, chat interface server 120 may include chat application 126, as alluded to above. Chat application 126 may be a distributed application implemented on one or more client computing devices 104 as client chat application 127, as described herein. In some embodiments, chat application 126 included in chat interface server 120 may provide client functionality to enable user 150 to operate client mobile application 148 running on client computing device 104. For example, the client chat application 127 may include a chat interface (not illustrated) which allows user 150 to use natural language commands to operate client mobile application 148. In some embodiments, the chat interface may allow user 150 to operate client mobile application 148 by exchanging messages with one or more chat assistants (e.g., human users or automated software agents or bots). For example, these chat assistants may help user 150 to operate the client mobile application 148 by eliciting commands from user 150 intended for client mobile application 148, generating responses, and effectuating client mobile application 148 to generate results associated with the commands received form user 150. By virtue of exchanging messages with an assistant, user 150 can operate client mobile application 148 without having to learn an interface associated with mobile application 148 resulting in a more efficient and streamlined user experience.

In some embodiments, distributed chat application 126 may be implemented using a combination of hardware and software. In some embodiments, chat application 126 may be a server application, a server module of a client-server application, or a distributed application (e.g., with a corresponding client chat application 127 running on one or more client computing devices 104).

In some embodiments, chat interface server 120 may also include a database 122. For example, database 122 may store communications or messages exchanged via the chat interface, user data associated with user 150, and/or other information. In some embodiments, individual user accounts may be used to indicate whether user 150 provides permission to store such data, as will be described in detail below.

In some embodiments, as alluded to above, chat interface server 120 may comprise computer program components operable by the processor to enable exchange of messages between user 150 and one or more human users or bots. In some embodiments, chat interface server 120 may include one or human expert users or agents assisting user 150 in operating client mobile application 148 provided on client computing device 104.

In some embodiments, human chat assistants may be selected from a group of specially trained assistants or experts. For example, expert assistants may be skilled in providing assistance to users operating a particular mobile application (e.g., Uber, Expedia, and so on). In some embodiments, the experts may be implemented on expert server 130. In yet other embodiments, the experts may be implemented on client device 104 and not on chat interface server 120.

In some embodiments, automated software assistants or bots may be provided by distributed chat application 126. For example, the automated assistant or bot may interact with users through text, e.g., via chat interface of client chat application 127. In some embodiments, an automated assistant may be implemented by an automated assistant provider such that it is not the same as the provider of distributed chat application 126.

In some embodiments, as alluded to above, one or more expert servers 130 may implement chat assistant services, including human expert services, bot services, and/or other similar services as described in further detail below. In some embodiments, one or more expert servers 130 may include one or more processors, memory and network communication capabilities (not shown). In some embodiments, expert server 130 may be a hardware server connected to network 103, using wired connections, such as Ethernet, coaxial cable, fiber-optic cable, etc., or wireless connections, such as Wi-Fi, Bluetooth, or other wireless technology. In some embodiments, expert server 130 may transmit data between one or more of the chat interface server 120 and client computing device 104 via network 103. In some embodiments, expert server 130 may be managed by the same party that manages chat interface server 120. In other embodiments, expert server 130 may a be third-party server, e.g., controlled by a party different from the party that provides chat interface services (i.e., chat interface server 120).

In some embodiments, as alluded to above, user 150 may exchange messages with one or more assistants within a chat interface of client chat application 127 provided on client user device 104. For example, user 150 may enter natural language commands and receive responses from the expert agents.

In some embodiments, client computing device 104 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing device 104 may present content to a user and receive user input. In some embodiments, client computing device 104 may parse, classify, and otherwise process user input. For example, client computing device 104 may store user input including commands for initiating client chat application 127, as will be described in detail below.

In some embodiments, client computing device 104 may be equipped with GPS location tracking and may transmit geolocation information via a wireless link and network 103. In some embodiments, chat interface server 120 and/or distributed chat application 126 may use the geolocation information to determine a geographic location associated with user 150. In some embodiments, chat interface server 120 may use signal transmitted by client computing device 104 to determine the geolocation of user 150 based on one or more of signal strength, GPS, cell tower triangulation, Wi-Fi location, or other input. In some embodiments, the geolocation associated with user 150 may be used by one or more computer program components associated with the chat application 126 during user 150 interaction with chat interface of the client chat application 127.

In some embodiments, mobile application server 140 may include one or more processors, memory and network communication capabilities. In some embodiments, mobile application server 140 may be a hardware server connected to network 103, using wired connections, such as Ethernet, coaxial cable, fiber-optic cable, etc., or wireless connections, such as Wi-Fi, Bluetooth, or other wireless technology. In some embodiments, mobile application server 140 may transmit data between one or more of chat interface server 120, client computing device 104, and/or other components via network 103.

In some embodiments, mobile application server 140 may include one or more distributed mobile applications (e.g., mobile application 146) implemented on client computing device 104 as client mobile application 148. In some embodiments, user 150 may instruct the mobile server 140 to download mobile application 146 on client computing device 104 as client mobile application 148. For example, in response to user 150 requesting to download the client mobile application 146, the mobile application server 140 may transmit the data to client computing device 104 to execute client mobile application 148 on client computing device 104.

In some embodiments, mobile application 146 may communicate and interface with a framework implemented by distributed chat application 126 using an application program interface (API) that provides a set of predefined protocols and other tools to enable the communication. For example, the API can be used to communicate particular data from chat application 126 used to connect to and synchronize with client mobile application 148 that user 150 is operating via the chat interface of client chat application 127.

By virtue of providing communication between distributed chat application 126 and/or client chat application 127 and client mobile application 148 results in an efficient control of mobile application functions. For example, user commands received as input to the chat interface can be input to client mobile application 148, allowing the mobile application to respond to commands and messages from the chat interface of client chat application 127.

In some embodiments, client mobile application 148 can send events or notifications directly to client chat application 127 to be displayed via the chat interface. By virtue of displaying the notifications within client chat application 127 allows users not currently actively interacting with client mobile application 148 to stay informed of any changes and/or events. For example, user 150 searching for airline tickets may receive a notification that a price of an airline ticket decreased prompting user 150 to initiate a purchase transaction. This can improve the engagement, retention, and awareness of users about the occurrence of events and changes within mobile application relevant to user 150.

In some embodiments, a single chat interface may be used to control multiple mobile applications simultaneously. For example, by using the chat interface with several mobile applications in association with a single chat interface allows users to interact with the mobile application with reduced user input and reduced time. That is, when using a single chat interface to interact with multiple mobile applications allows to reduce consumption of device resources that would otherwise be needed to process, display, and receive user input in multiple mobile applications. Further, using a single chat application with multiple mobile applications my reduce and/or eliminate time required for switching displays of different interfaces for different mobile applications on a client computing device, reducing copying and pasting displayed data in one mobile application to another mobile application and its interface, and reducing the repeating of commands.

In some embodiments, a standard API can be used between distributed chat application 126 and/or client chat application 127 and client mobile application 148, allowing user 150 to control a large variety of mobile applications provided by many different providers.

FIG. 2 illustrates an example chat interface server 120 configured in accordance with one embodiment. In some embodiments, as alluded to above, chat interface server 120 may include a distributed chat application 126 and a corresponding client chat application 127 running on one or more client computing devices 104. The corresponding client chat application 127 may comprise a chat interface 129 and may be configured to provide client functionality to enable user 150 to operate mobile application 148 provided on client computing device 104 via natural language commands entered via chat interface 129 rather than a GUI 149 associated with mobile application 148. For example, a user can interact with a particular mobile application using text commands in a natural language entered into the chat interface in order to complete a particular task, as alluded to above.

In some embodiments, distributed chat application 126 may be operable by one or more processor(s) 124 configured to execute one or more computer program components. In some embodiments, the computer program components may include one or more of a chat interface component 106, a chat component 108, a chat processing component 110, a response component 112, a GUI response component 114, and/or other such components.

In some embodiments, as alluded to above, user 150 may access the chat interface server 120 via client computing device 104. In some embodiments, chat interface component 106 may be configured to initiate client chat application 127 on client computing device 104. For example, chat interface component 106 may be configured to detect one or more user inputs or interactions from one of the client computing devices 104 and interpret the detected input or interaction as a command for initiating client chat application 127.

In some embodiments, user 150 may initiate the client chat application 127 by interacting with an icon corresponding to client chat application 127 which has been downloaded onto client computing device 104 over network 103. For example, client chat application 127 may be initiated upon receiving input from user 150 (i.e., the user selects the icon). In other embodiments, user 150 may initiate chat application 127 via one or more haptic commands, voice commands, and/or a combination of haptic and voice commands. For example, the haptic commands may include user 150 knocking, tapping, and/or scratching on client computing device 104. Alternatively, user 150 may initiate client chat application 127 by speaking a voice command (e.g., "Start Chat").

In some embodiments, the haptic commands associated with initiating the client chat application 127 may be selected by the chat application 126 running on the chat interface server 120. For example, the chat application 126 may include a double knocking command used to initiate the client chat application 127. In some embodiments, user 150 may modify the haptic command selection to another command available to the user. For example, user 150 may indicate that instead of double knocking, the user wants to initiate client chat application 127 by scratching client computing device 104. In some embodiments, user 150 may create a new haptic or voice command by recording the user input associated with the command.

In some embodiments, chat interface component 106 may be configured to capture audio signal produced from the haptic input (such as knocking, tapping, or scratching) or voice input (such as a command spoken by a user) by the device microphone. For example, user 150 may knock twice on the device resulting in an audio signal. In some embodiments, the captured audio signal may be obtained by chat interface component 106 to determine whether the audio signal corresponds to the audio signal used to initiate client chat application 127. For example, the audio signal may be obtained from a microphone of client computing device 104. In some embodiments, chat interface component 106 may be configured to manipulate the audio signal obtained by transmitting the audio signal to the chat interface server 120. In some embodiments, chat interface component 106 may be configured to process audio signal. For example, chat interface component 106 may be configured perform at least one of a noise removal, windowing and a spectrum analysis during processing of the audio signal. In some embodiments, chat interface component 106 may be configured to determine if the audio signal received from the microphone of client computing device 104 is a valid haptic input or a voice command by matching the processed audio signal to a valid audio signal. In some embodiments, the valid audio signal may be obtained from database 122.

Figure 3:
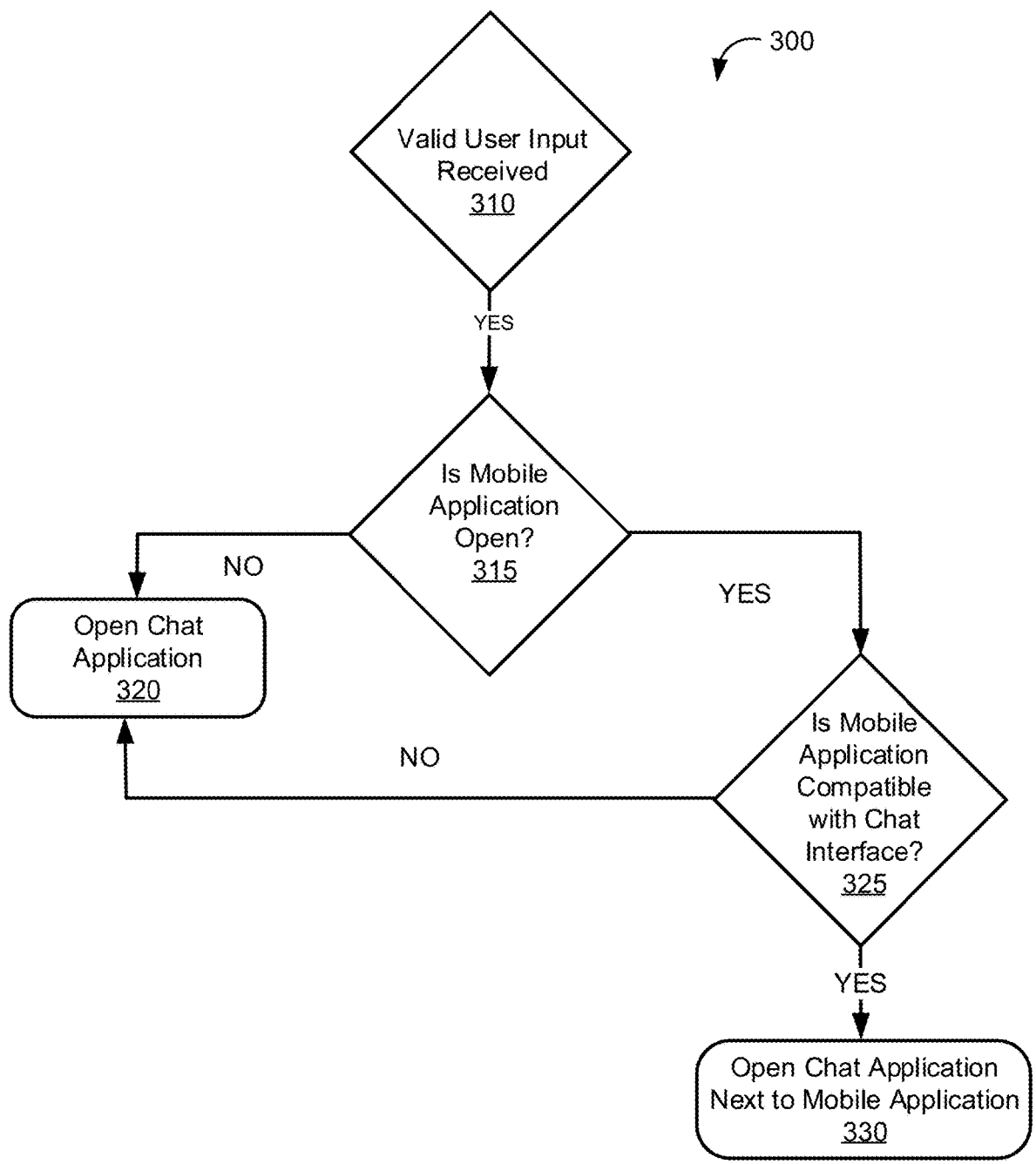
FIG. 3 illustrates an example process for initiating a client chat application, according to an implementation of the disclosure.

In some embodiments, upon determining that the haptic or voice command is valid, chat interface component 106 may be configured to initiate client chat application 127 on client computing device 104. FIG. 3 illustrates a flow diagram describing a method for initiating a chat application on a client computing device, in accordance with one embodiment. In some embodiments, method 300 can be implemented, for example, on a server system, e.g., chat interface server 120, as illustrated in FIG. 1. At operation 310, chat interface component 106 determines whether received user input command (i.e., haptic or voice command) for initiating the chat application is valid. For example, as alluded to earlier, chat interface component 106 may process an audio signal obtained from a microphone of client computing device and compare it a valid audio signal. At operation 315, upon determining that the received user input for initiating chat application is valid, chat interface component 106 determines whether the mobile application has already been initialized within the client computing device. At operation 320, upon determining that the mobile application has not been initialized within the client computing device, chat interface component 106 initiates the chat application within the client computing device. At operation 325, upon determining that the mobile application has been initialized within the client computing device, chat interface component 106 may be configured to determine whether the particular mobile application is compatible to be used with the chat interface of the chat application. At operation 330, upon determining that the mobile application initialized within the client computing device is compatible to be used with the chat interface of the chat application, chat interface component 106 initiates the chat application such that the chat application is displayed adjacent to the mobile application on the client computing device.

Referring back to FIG. 2, in some embodiments, chat interface component 106 may be configured to initiate client chat application 127 upon initiating client mobile application 148 automatically, i.e., without receiving additional user input. In some embodiments, the automatic initiation of client chat application 127 may be determined by the one or more initiation settings associated with the chat application 126 running on the chat interface server 120. For example, the chat application 126 may be associated with one or more mobile applications that would cause client chat application 127 to be initiated on client computing device 104 upon initiation of those mobile application without any additional user input. In some embodiments, user 150 may modify which mobile applications would trigger automatic initiation of chat application 127. For example, user 150 may indicate that only a particular mobile application would cause the automatic initiation of client chat application 127.

In some embodiments, chat interface component 106 may be configured to initiate client mobile application 148 upon receiving user input entered into the chat interface 129 of client chat application 127. For example, user 150 may initiate client mobile application 148 within client computing device 104 by entering a corresponding text command within the chat interface of client chat application 127 on client computing device 104. In some embodiments, the text command may be explicit (e.g., "Start Uber"). In yet other embodiments, chat interface component 106 may be configured initiate client mobile application 148 upon receiving a text command that is not explicit (e.g., "I need a ride").

In some embodiments, chat component 108 may be configured to obtain, manage, and route user input provided and/or exchanged during a chat session. For example, as alluded to above user 150 can enter user input as one or more natural language commands (i.e., chat messages) entered via chat interface 129 of client chat application 127 on client computing device 104. In some embodiments, user 150 can provide user input to chat interface 129 via a touchscreen, physical buttons or a keyboard associated with client computing device 104. In yet other embodiments, user 150 can provide user input comprising voice input, or other types of input. In some embodiments, chat component 108 may be configured to store user input obtained within one or more previously mentioned memory components associated with chat interface server 120. In some embodiments, chat component 108 may store the messages within database 122.

In some embodiments, chat processing component 110 may be configured to process user input obtained by chat component 108. For example, chat processing component 110 may process audio input entered via a microphone of client computing device 104. In some embodiments, chat processing component 110 may process user input comprising an audio file by performing one or more operations including, for example, voice recognition, conversion of voice messages into textual format, and/or other such operations.

In some embodiments, chat processing component 110 may convert the user input comprising an audio file into a text file by converting the audio file into the text file according to a voice recognition process that may be implemented by the chat application 146. For example, after obtaining the user audio file, chat processing component 110 may convert the audio file to the text file according to the voice recognition process algorithm implemented by distributed chat application 126 and/or client chat application 127. In some embodiments, chat processing component 110 may perform voice recognition by means of a pattern matching method and/or other similar method. For example, when using a pattern matching method to perform voice recognition, a training stage and a recognition stage may be used.

As alluded to earlier, user input including natural language commands entered via chat interface 129 of client chat application 127 may be used to operate a mobile application (e.g., mobile application 148). By virtue of using commands to complete a particular task rather than using a graphical user interface of a particular mobile application, the user is provided with a "store front" experience. That is, rather than deciding what element of the graphical user interface associated with client mobile application 148 to engage with, user 150 is instead prompted by messages from the chat assistant with chat interface 129 of client chat application 127.

In some embodiments, response component 112 may be configured to handle responses to commands from user 150 within the chat interface 129. For example, response component 112 may be configured to handle responses to user commands generated by automated chat assistants, as alluded to earlier. In some embodiments, an automated assistant may be implemented as a computer program or application (e.g., a software application) that is configured to interact with user 150 via client chat application 127 to provide information or to perform specific actions within mobile application 148.

In some embodiments, the response component 112 may be configured to provide information items relevant to user command (e.g., a flight from Denver to Miami with no layovers at a particular price). By virtue of utilizing an automated assistant rather than a human assistant, permits the automated assistant to review large sets of data in multiple data sources (i.e., mobile application) within a short period of time.

For example, user 150 may be interested in purchasing direct flight tickets from Denver to Miami but wants to do so from a provider that has the lowest prices. Conventionally, a user would have to visit multiple mobile applications for individual providers and compare prices. While using a human chat assistant may improve user experience, as it would eliminate user 150 from visiting the provider applications personally, it would still require the human assistant to manually determine which provider offers the best pricing. In contrast, an automated chat assistant may determine which mobile application is best suited for a particular user purpose (i.e., offers lowest concert tickets) by obtaining information from multiple mobile applications within a reduced time frame thereby improving the response time.

In some embodiments, response component 112 and/or other components (e.g., the one or more expert servers 130) of the environment 100 illustrated in FIG. 1, may be configured to use machine learning, i.e., a machine learning model that utilizes machine learning to determine responses to user requests. For example, in a training stage, the expert server (or other component) can be trained using training data (e.g., message training data) of actual or generated messages in a messaging application context, and then at an inference stage can determine suggested items to new messages or other data it receives. For example, the machine learning model can be trained using synthetic data, e.g., data that is automatically generated by a computer, with no use of user information. In some embodiments, the machine learning model can be trained based on sample data, e.g., sample message data, for which permissions to utilize user data for training have been obtained expressly from users providing the message data. For example, sample data may include received messages and responses that were sent to the received messages. Based on the sample data, the model can predict message responses to received messages, which may then be provided as suggested items.

In some embodiments, response component 112 may be configured to use one or more of a deep learning model, a logistic regression model, a Long Short Term Memory (LSTM) network, supervised or unsupervised model, etc. In some embodiments, response component 112 may utilize a trained machine learning classification model. For example, the machine learning may include, decision trees and forests, hidden Markov models, statistical models, cache language model, and/or other models. In some embodiments, the machine learning may be unsupervised, semi-supervised, and/or incorporate deep learning techniques.

In some embodiments, GUI response component 114 may be configured to effectuate actions within mobile interface 149 of client mobile application 148 based on user commands entered via chat interface 129. For example, GUI response component 114 may effectuate presentation of items relevant and/or responsive to user's request within GUI 149 of client mobile application 148 (e.g., available flights at a particular date, tickets at a particular price, etc.) In some embodiments, user commands may include one or more actions executed by client mobile application 148. For example, the user commands may include booking a flight, making a dinner reservation, requesting to be picked up by a ride share driver, purchasing a pair of shoes, and so on. In some embodiments, GUI response component 114 may execute one or more action within mobile interface 149 based on user commands. For example, upon receiving a user command to book a ticket, mobile interface 149 may display the flight reservation information associated with the order included in the user command.

FIGS. 4A-4D illustrate an example chat application comprising a chat interface initiated by a user to control and/or operate a mobile application displayed by the client computing device. For example, in FIG. 4A, a chat interface 429 of a chat application 427 is displayed on a client computing device 401 operated by a user 410. In this example, a chat conversation between user 410 and chat assistant 412 has been initiated. In some embodiments, the chat conversation may be between user 410 and a human chat assistant or an automated chat assistant. In some embodiments, user commands from the user to the chat conversation may be entered device and displayed in chat interface 429 by chat application 427. For example, user commands from the user 410 can be entered in a text input field 430 of the chat interface 429 (e.g., via input devices such as a physical keyboard, displayed touchscreen keyboard, voice input, etc.).

In this example, user 410 may initiate a mobile application 448 within client computing device 404 by entering a text command within the chat interface 429 of chat application 427 on client computing device 404. For example, user 410 may enter a text command (e.g., text command 437 illustrated in FIG. 4A) via a text input field 430 using a keyboard 415 associated with chat interface 429. In some embodiments, user 410 may enter voice commands by initiating a voice command interface 420.

In some embodiments, upon initiating chat application 427, the chat interface 429 of the chat application 427 may display an icon or avatar associated with user 410 and indicate that user 410 is currently engaged in a chat session with chat assistant 412. Chat assistant 412 may be associated with a particular icon or avatar as indicated in FIGS. 4A-4B.

In some embodiments, upon initiating chat application 427, user 410 may be greeted by chat assistant 412 displayed as a text message 433: "Hi John! Welcome to Chat Interface. What service would you like to use?" In response, user 410 may enter a text command 437, indicating that they want to initiate interaction with a ride sharing service application, by stating "I need an Uber."

In this example, user 410 has entered a command in the text input field 430, where the received command is displayed as message 437 in chat interface 429 after being input. This command specifies a mobile application to be displayed in association with the chat application, e.g., in this case a mobile application provided by the ridesharing company Uber Technologies, Inc. In some embodiments, the user command may not have specified the ridesharing application and included only "I need a ride". In that case, the user may select a mobile application from a list provided by the chat assistant or selected by the chat assistant based on at least one of a user preferences, ridesharing availability, best prices, and/or other such parameter.

In response to the command 437, a response message 439 may be displayed in chat interface 429. For example, response message 439 indicates that the selected mobile application is being initiated.

In response to user command 437, mobile application 448 may be initiated and displayed within the client computing device 404, as illustrated in FIG. 4B. In some embodiments, mobile application interface 449 is displayed based on data received by the client computing device 404 over the network, e.g., from mobile application 448 at least partially executing on a remote session server or other device connected over the network.

In some embodiments, mobile application interface 449 is displayed underneath chat interface 429. In this example, mobile interface 449 is displayed such that chat interface 429 is at least partially displayed, e.g., allowing one or more chat messages in the chat interface 420 to be simultaneously displayed with the mobile application interface 449.

In some embodiments, upon initiating mobile application 448, the size of the chat interface 429 may be reduced so as to accommodate the display of both the mobile application interface 449 and the chat interface 429. In some embodiments, mobile application interface 449 may be configured to display content data associated with mobile application 448 (e.g., map data, driver information, etc.), and a screen control 460 allowing the user to provide user input to enlarge mobile application interface 449 to fit the entire screen (or other display area) of client computing device 404.

In some embodiments, user 410 may optionally toggle between the full-screen and reduced-screen chat interface 429 illustrated in FIGS. 4A, 4B, respectively. For example, the user may reduce the full-screen chat interface 429 illustrated in FIG. 4A via a screen size button 458. Alternatively, user 410 may enlarge reduced-screen chat interface 429 illustrated in FIG. 4B via a screen size button 459. In some embodiments, user 410 may reduce full-screen chat interface 429 or enlarge the reduced-screen chat interface 429 by entering an appropriate text command via text input field 430.

In some embodiments, upon initiating the mobile application 448, the user may choose to interact with the graphical user interface 449 provided by the mobile application 448 or continue their interaction within the chat interface 429. As illustrated in FIG. 4B, chat assistant 412 may further inquire via a text message 440: "John, do you want an Uber Expert to help you find a ride?" User 410 may provide a response by entering a command 441 indicating that he indeed would like assistance from an expert assistant familiar with this particular mobile application. In some embodiments, chat assistant 412 may inquire whether the user is in need of additional assistance after an occurrence of an event (e.g., user input not received within mobile interface within a particular time period).

FIGS. 4C-4D, illustrate a chat interface used for a conversation between a user and an expert assistant to control a mobile application. Upon receiving user command 441 (illustrated in FIG. 4B) indicating that user 410 is interested in receiving help from an expert assistant, chat interface 429 illustrated in FIG. 4C, may display an icon or avatar associated with user 410 and indicate that user 410 is currently engaged in a chat session with an expert chat assistant 413. In this example, expert chat assistant 413 may include a particular icon or avatar associated with mobile application 448 currently initiated by the user 410.

As illustrated in FIG. 4C, expert chat assistant 413 may further inquire in a chat interface 427 via a text message 443: "When would you like your Uber driver to arrive?" User 410 may provide a response by entering a command 445 indicating that he wants the Uber driver to arrive in 30 min. In some embodiments, expert chat assistant 413 may have the ability to obtain user's location from client computing device 404 when user 410 permits access to location information. For example, expert chat assistant 413 may inquire whether user 410 needs to be picked up at his current location in a message 447. User 410 may provide a response by entering a command 449 indicating that he wants the Uber driver to arrive to his brother's house. In some embodiments, expert chat assistant 413 may have the ability to obtain location information associated with user's contacts from client computing device 404 or from application data stored with mobile application 448 when the user 410 permits access to their contact information. Expert chat assistant 413 may further inquire whether user 410 wants to use a particular service (e.g., Uber X, Uber Pool, or Uber Select) associated with mobile application 448 in a message 450. User 410 may provide a response by entering a command 451 indicating that he wants to use the Uber X service.

In FIG. 4D, expert chat assistant 413 may respond in a message 453 indicating that the Uber driver has been reserved and is arriving to a location specified by user 410 (i.e., user's brother's house) at a time specified by user 410 (i.e., in 30 minutes). Additionally, mobile interface 449 may be displayed underneath chat interface 429. In this example, mobile interface 449 includes information based on data received from mobile application 448.

FIGS. 5A-5E illustrate additional example chat applications comprising a chat interface initiated by a user to control and/or operate a mobile application displayed by the client computing device. For example, in FIG. 5A, a chat interface 529 of a chat application 527 is displayed on a client computing device 504 operated by a user 510. In this example, a chat conversation between user 510 and an expert chat assistant 513 has been initiated. In some embodiments, user commands from the user to the chat conversation may be entered via client computing device 504 and displayed in chat interface 529 by chat application 527. For example, user commands from user 510 can be entered in a text input field 530 of chat interface 529 or by initiating a voice interface 520.

In this example, user 510 may initiate mobile application 548 within client computing device 504 by entering a text command within chat interface 529 of 4 chat application 527 on client computing device 504. For example, the user 510 may enter a text command (e.g., text command 537 illustrated in FIG. 5A) via a text input field 530.

In some embodiments, upon initiating chat application 527, user 510 may be greeted by expert chat interface assistant 513 displayed as a text message 535: "Hi John! Welcome to Chat Interface. What service would you like to use?" In response, user 510 may enter a text command 537 by indicating that he wants to initiate interaction with a flight booking application by stating: "I need to go from Grand Juncture to San Juan on Saturday." Prior to initiating mobile interface 549, expert chat assistant 513 may obtain additional details associated with user's 510 request. For example, expert chat assistant 513 may inquire in a message 539 whether layovers during the flight are acceptable. User 510 may enter a user command 541 indicating that layovers are not acceptable. Next, expert chat assistant 513 may inquire in a message 543 whether early morning departures are acceptable. User 510 may enter a user command 545 indicating that early morning departures are not acceptable.

Figure 5B:
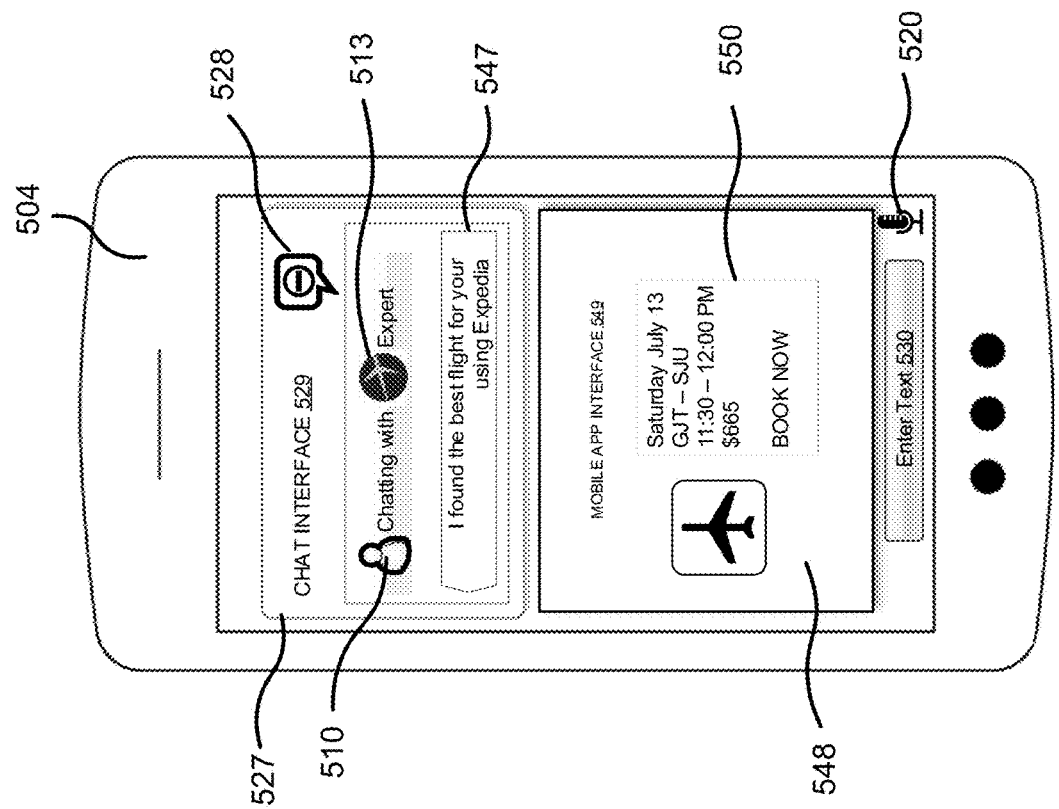

In FIG. 5B, expert chat assistant 513 may respond in a message 547 indicating that the best flight matching user's requirements has been located. The details of the flight 550 may be displayed within mobile application interface 549 of mobile application 548 displayed underneath chat interface 529. In this example, mobile application interface 549 includes information based on data received from mobile application 548 which in turn was provided from chat interface 529 of chat application 527.

In some embodiments, user 510 may modify one or more previously provided user commands. For example, user 510 may locate a previously provided user command (e.g., by using a scrolling motion), modify it, and obtain a new response based on the modified information. In some embodiments, the response by chat assistant 513 may be provided based on both previously entered user commands and new information. By virtue of modifying one or more user commands, the chat interface may generate a new response without requiring user to re-enter all of the previously inputted information which can be time consuming and tedious.

In some embodiments, chat application 527 may provide a chat application GUI 569, in addition to chat interface 529. Chat application GUI 569 may be used to display the original response and a new response generated based on modified information entered by user 510. In some embodiments, the old response and the new response (i.e., a differential of the old response) may be graphically displayed within chat application GUI 569. In some embodiments, both old and new user commands and old and new responses generated in response to user commands may be displayed graphically to allow user 510 to visualize the conversation. For example, user commands and responses may be displayed hierarchically. That is, a modified user command may be displayed as a branch off the original user command. Similarly, a corresponding new response generated in response to the modified user command may be displayed alongside the old response. By virtue of displaying user commands and response using branch visualization, allows user 510 to view the conversation overview easily. In some embodiments, user 510 may modify user commands in chat application GUI 569 by directly accessing individual branches corresponding to user commands (e.g., by tapping or pressing the icon representing particular branch). In yet other embodiments, user 510 may compare results for different branches by dragging one branch to the other.

Figure 5A:
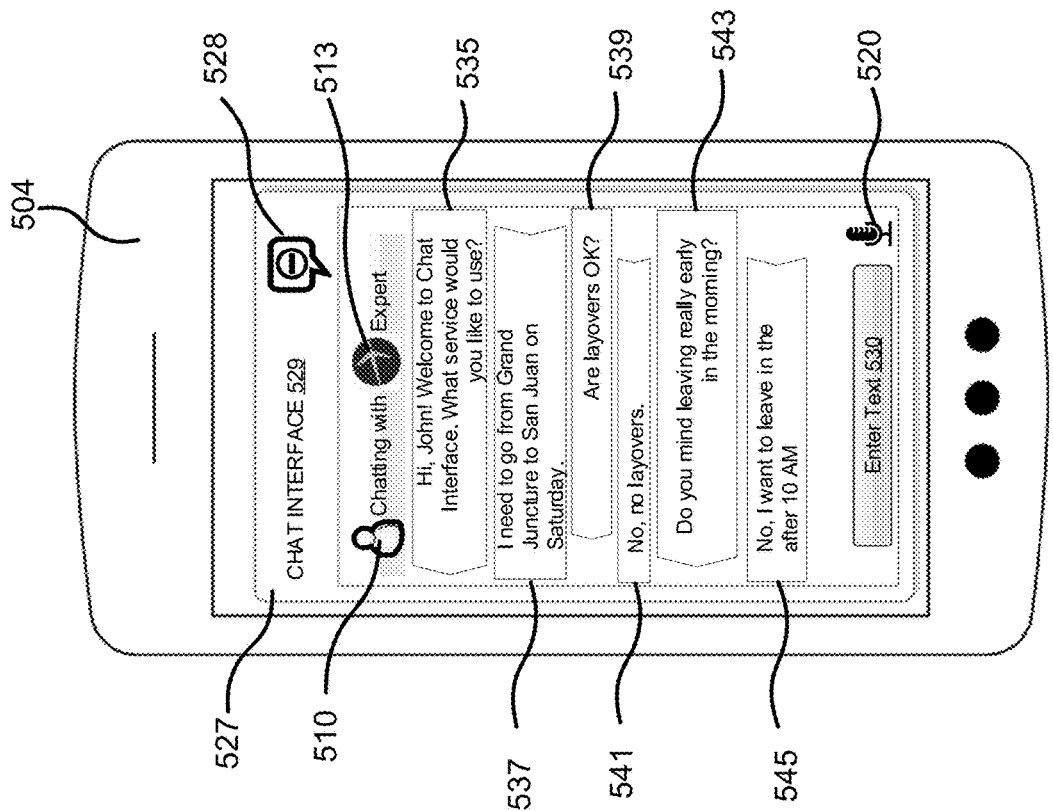
Figure 5C:
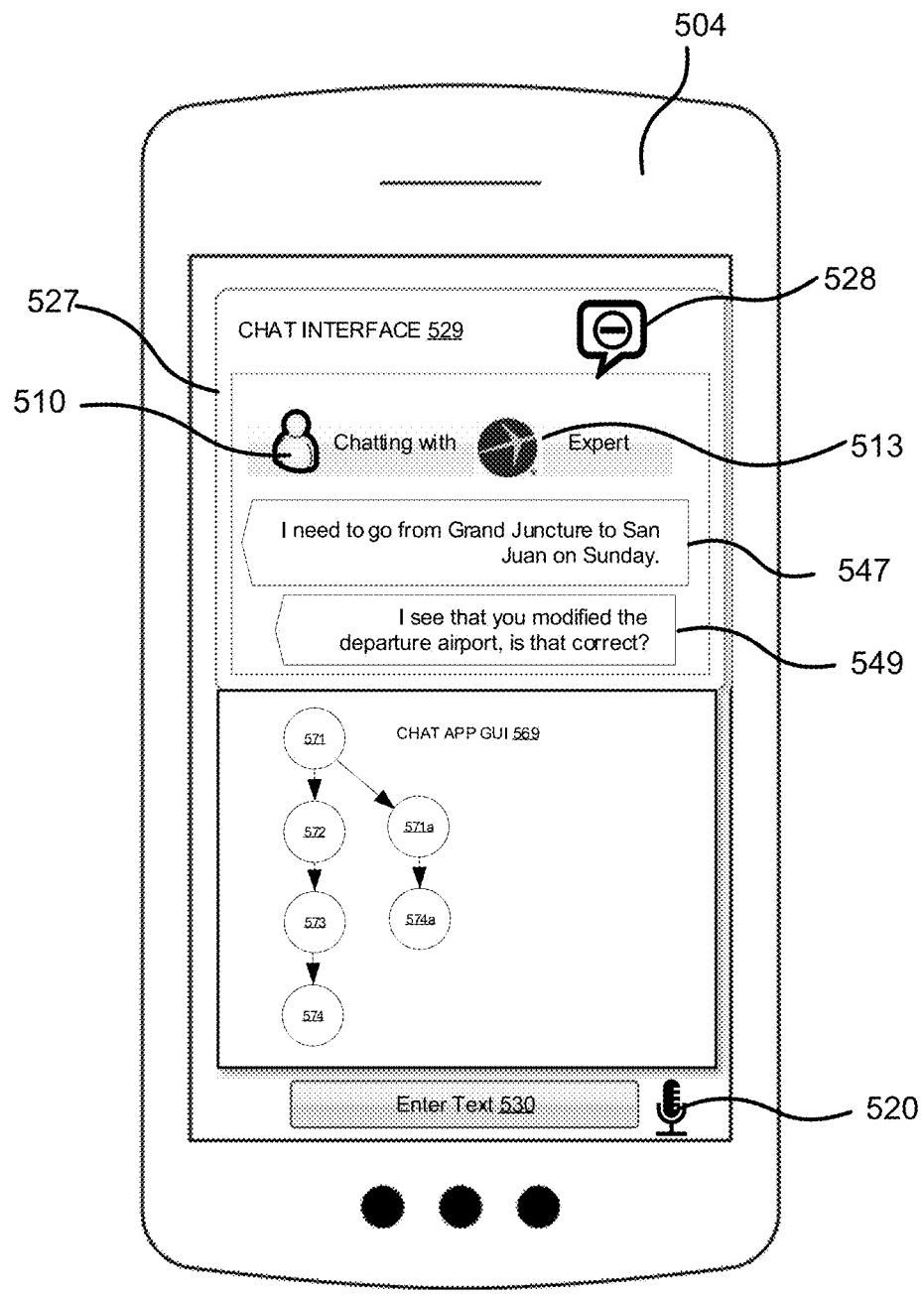

For example, as illustrated in FIG. 5C, the user may modify previously entered command 537 illustrated in FIG. 5A. In this example, user command 537 input in FIG. 5A indicated that user 510 wants to travel from Grand Juncture to San Juan on Saturday. However, the modified user command 547 illustrated in FIG. 5C, indicates that user 510 wishes travel from Grand Juncture to San Juan on Sunday. Expert chat assistant 513 may respond in a message 549 acknowledging that a modification has been made and asking user 510 to confirm it. Chat application GUI 569 may display the conversation between user 510 and chat assistant graphically using a branch visualization or such similar method. For example, original (i.e., oldest) user command input 537 in FIG. 5A may be displayed as element 571. User commands that followed original user command input 537, e.g., user commands 541, 545 may be displayed following original user command element 571 as elements 572, 573, respectively. Modified user command 547 may be displayed as element 571a as a branch of original user command element 571. Original response 550 illustrated in FIG. 5B may be displayed as element 574. A modified response may be displayed under the corresponding user command 571a as element 574a. Modified response 574a may be generated based on modified user command 571a and original user commands 572, 573 thus allowing user 510 to avoid re-entering the information.

In some embodiments, as alluded above, user 510 may drag element 571a to element 571 to compare the results for original and modified user commands. In other embodiments, user 510 may request a comparison by input user command asking for a comparison rather than by dragging or otherwise manipulating elements within chat application GUI 569. For example, as illustrated in FIG. 5D, user 510 may input a user command 581 asking for a comparison. In response, expert chat assistant 513 may generate a comparison as indicated by a response 582. The comparison may include original response 550 (i.e., details of the flight from Grand Juncture to San Juan on Saturday) illustrated in FIG. 5B, and a new response 551 (i.e., details of the flight from Grand Juncture to San Juan on Sunday).

In some embodiments, the modified response to modified user command may be displayed within mobile interface 549 of mobile application 548. For example, in FIG. 5E, expert chat assistant 513 may respond in a message 583 acknowledging that a modification has been made and asking user 510 to confirm it. User 510 may confirm by input user command 584. In response, expert chat assistant 513 may respond in a message 585 indicating that the best flight matching user's requirements has been located. Modified response (i.e., details of the flight from Grand Juncture to San Juan on Sunday rather than Saturday) may be displayed within the mobile interface 549 underneath the chat interface 529. In this example, the mobile interface 549 includes information based on data received from the mobile application 548 which in turn was provided from the chat interface 529 of the chat application 527.

Figure 6:
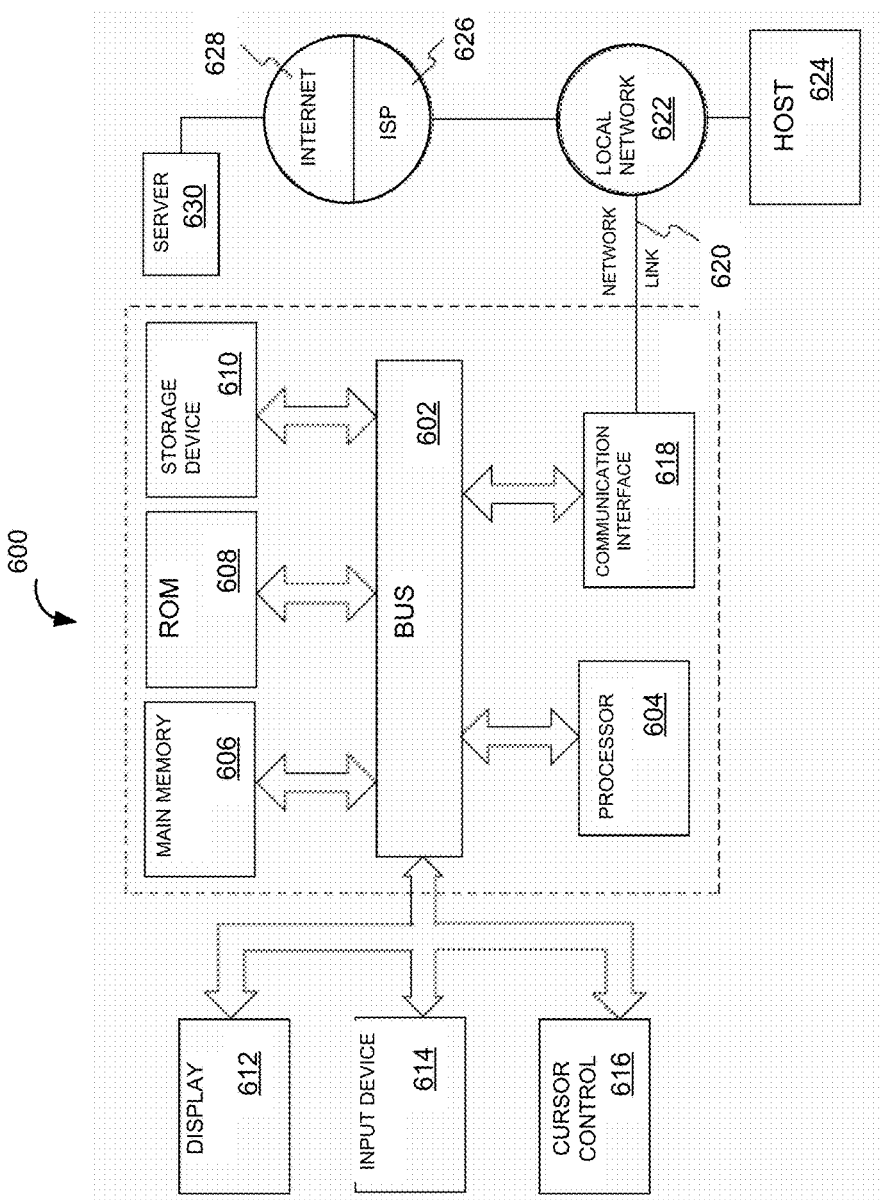
FIG. 6 illustrates an example computing system that may be used in implementing various features of embodiments of the disclosed technology.

FIG. 6 illustrates an example computing module 600, an example of which may be a processor/controller resident on a mobile device, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations.

Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage devices 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 622 and a storage unit interface 620. Examples of such storage units 622 and storage unit interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit interface 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for operating a mobile application using natural language commands the method comprising:
    obtaining a command for initiating a conversation interface configured to receive user input comprising one or more commands for controlling a mobile application running on a computing device operated by the user, and to display assistant user input comprising one or more responses generated by an assistant user based on the user input, wherein the one or more commands and the one or more responses are displayed within the conversation interface in a tree-branch configuration, such that individual responses are displayed in association with individual commands to which they respond;
    initiating the conversation interface responsive to the command, wherein the conversation interface is displayed adjacent to a graphical user interface (GUI) of the mobile application;
    in response to a first command obtained from the user, obtaining a first response generated by the assistant user, the first command and the first response displayed in a first branch of the tree-branch configuration of the conversation interface;
    updating the mobile application based on the first user command received from the user;
    in response to a second command obtained from the user, wherein the second command modifies the first command, obtaining a second response generated by the assistant user, the second command and the second response displayed in a second branch of the tree-branch configuration of the conversation interface; and
    updating of the mobile application based on the second command received from the user;
    wherein the first command is not the last command of the first branch;
    wherein the updating the mobile application comprises updating the GUI of the mobile application.

2. The method of claim 1, further comprising in response to a second command obtained from the user, obtaining a second response generated by the assistant user, the second command and the second response displayed in the first branch of the tree-branch configuration of the conversation interface.

3. The method of claim 1, further comprising in response to a second command obtained from the user, wherein the second command modifies the first command, obtaining a second response generated by the assistant user, the second command and the second response displayed in the first branch of the tree-branch configuration of the conversation interface;
    wherein the first command is the last command of the first branch.

4. The method of claim 1, wherein the obtaining the command for initiating the conversation interface originates from the computing device operated by the user.

5. The method of claim 4, wherein the obtaining the command for initiating the conversation interface is obtained during an active session of the mobile application.

6. The method of claim 1, wherein the updating the GUI of the mobile application comprises causing the mobile application to perform one or more actions including at least one of a travel reservation, a dining reservation, and a purchase transaction.

7. The method of claim 1, wherein the assistant user is a human user experienced in operating the mobile application.

8. The method of claim 1, wherein the assistant user is an automated software agent.

9. A system for operating a mobile application using natural language commands, the system comprising:
    one or more physical processors configured by machine-readable instructions to:
    obtain a command for initiating a conversation interface configured to receive user input comprising one or more commands for controlling a mobile application running on a computing device operated by the user, and to display assistant user input comprising one or more responses generated by an assistant user based on the user input, wherein the one or more commands and the one or more responses are displayed within the conversation interface in a tree-branch configuration, such that individual responses are displayed in association with individual commands to which they respond;

initiate the conversation interface responsive to the command, wherein the conversation interface is displayed adjacent to a graphical user interface (GUI) of the mobile application;

in response to a first command obtained from the user, obtain a first response generated by the assistant user, the first command and the first response displayed in a first branch of the tree-branch configuration of the conversation interface;

update the mobile application based on the first user command received from the user;

in response to a second command obtained from the user, wherein the second command modifies the first command, obtain a second response generated by the assistant user, the second command and the second response displayed in a second branch of the tree-branch configuration of the conversation interface; and update of the mobile application based on the second command received from the user;

wherein the first command is not the last command of the first branch; and wherein the updating the mobile application comprises updating the GUI of the mobile application.

10. The system of claim 9, wherein the one or more physical processors are further configured to: in response to a second command obtained from the user, obtain a second response generated by the assistant user, the second command and the second response displayed in the first branch of the tree-branch configuration of the conversation interface.

11. The system of claim 9, wherein the one or more physical processors are further configured to: in response to a second command obtained from the user, wherein the second command modifies the first command, obtain a second response generated by the assistant user, the second command and the second response displayed in the first branch of the tree-branch configuration of the conversation interface; wherein the first command is the last command of the first branch.

12. The system of claim 9, wherein the command obtained for initiating the conversation interface originates from the computing device operated by the user.

13. The system of claim 12, wherein the command obtained for initiating the conversation interface is obtained during an active session of the mobile application.

14. The system of claim 9, wherein the update of the GUI of the mobile application comprises causing the mobile application to perform one or more actions including at least one of a travel reservation, a dining reservation, and a purchase transaction.

15. The system of claim 9, wherein the assistant user is a human user experienced in operating the mobile application.

16. The system of claim 9, wherein the assistant user is an automated software agent.

* * * * *